(12) United States Patent
Xu et al.

(10) Patent No.: US 11,509,555 B2
(45) Date of Patent: *Nov. 22, 2022

(54) DETERMINING OPERATIONAL STATUS OF INTERNET OF THINGS DEVICES

(71) Applicant: VMware, Inc., Palo Alto, CA (US)

(72) Inventors: Hui Xu, Palo Alto, CA (US); Jong Ho Won, San Jose, CA (US); Karen Brems, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/145,601

(22) Filed: Jan. 11, 2021

(65) Prior Publication Data

US 2021/0306239 A1 Sep. 30, 2021

Related U.S. Application Data

(63) Continuation of application No. 16/835,857, filed on Mar. 31, 2020, now Pat. No. 10,897,413.

(51) Int. Cl.

| H04L 12/26 | (2006.01) |
| H04L 29/08 | (2006.01) |
| H04L 12/24 | (2006.01) |
| H04L 12/28 | (2006.01) |
| H04L 43/0805 | (2022.01) |
| H04L 67/12 | (2022.01) |
| G06F 21/32 | (2013.01) |

(52) U.S. Cl.
CPC .......... *H04L 43/0805* (2013.01); *H04L 67/12* (2013.01)

(58) Field of Classification Search
USPC .......... 709/223, 224, 207, 229, 206
See application file for complete search history.

(56) References Cited

U.S. PATENT DOCUMENTS

| 10,038,700 | B1 | 7/2018 | Duchin et al. |
| 10,382,307 | B1 | 8/2019 | Jindal et al. |
| 10,440,579 | B1 * | 10/2019 | Korrapati ............... G01S 5/0205 |
| 10,735,370 | B1 | 8/2020 | Kandlur et al. |
| 10,897,413 | B1 * | 1/2021 | Xu ....................... H04L 43/0805 |
| 2017/0228253 | A1 * | 8/2017 | Layman ............... G06F 11/3013 |
| 2017/0264641 | A1 * | 9/2017 | Wood ................... H04L 61/1511 |
| 2018/0005186 | A1 * | 1/2018 | Hunn ....................... G06F 16/93 |
| 2019/0058711 | A1 | 2/2019 | Zhu et al. |
| 2019/0073846 | A1 * | 3/2019 | Kamkar .................... G07C 9/28 |
| 2019/0387011 | A1 | 12/2019 | Du et al. |
| 2020/0348662 | A1 * | 11/2020 | Cella ....................... H04W 52/16 |
| 2021/0120439 | A1 * | 4/2021 | Suba .................... H04W 64/006 |
| 2022/0191279 | A1 * | 6/2022 | Zhang ..................... H04L 67/12 |

* cited by examiner

Primary Examiner — Jude Jean Gilles
(74) Attorney, Agent, or Firm — Thomas | Horstemeyer LLP

(57) ABSTRACT

Disclosed are various examples for offline detection of Internet of Things (IoT) devices or any type of devices that report a heartbeat or status indication. A linked hash map be utilized as a data structure in which heartbeat message are stored. The oldest heartbeat message is stored at the head of the data structure so that only the head of the data structure requires checking if the oldest node is designated as online.

20 Claims, 4 Drawing Sheets

DETERMINING OPERATIONAL STATUS OF INTERNET OF THINGS DEVICES

CROSS REFERENCE TO RELATED APPLICATIONS

This application is a continuation of, and claims priority to and the benefit of, U.S. application Ser. No. 16/835,857, entitled "Determining Operational Status of Internet of Things Devices," filed on Mar. 31, 2020, which is hereby incorporated by reference in its entirety.

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data from theft, data loss, and unauthorized access. To access a network, IoT devices can connect through a gateway or another edge device. In some cases, IoT devices can communicate directly with a management service over a network connection.

Client devices, edge devices, IoT devices, and other devices can be required to report on their operational status with a management service or gateway. In other words, IoT devices can be configured to send heartbeat or keepalive messages to a management service or gateway device. As the number of IoT devices in various deployments or groupings can become large, tracking keepalive messages from a large number of devices can impose a computational strain on the management service. For example, if a table that has an entry for each device is maintained, the management service can be required to traverse the entire table after a check interval and determine whether a timestamp for a last received heartbeat message for each IoT device indicates that it is still operational. In such a framework, the number of operations or checks that must be performed to detect whether a given IoT device in a grouping is down is directly proportional to the number of IoT devices in the grouping, which can create scalability concerns.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
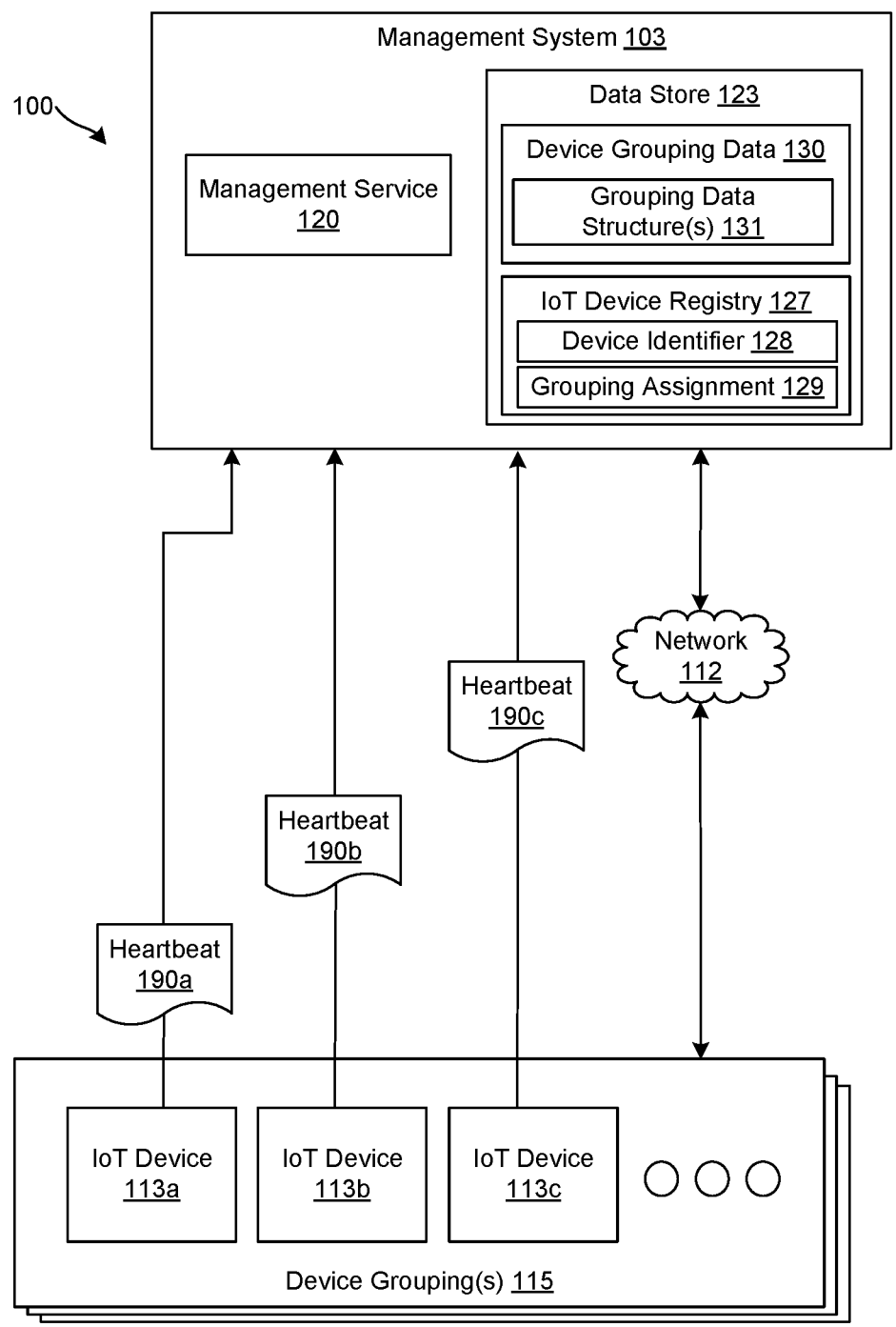
FIG. 1 is a drawing of an example of a networked environment that includes elements involved in onboarding a gateway.

The present disclosure relates to detecting whether one or more Internet-of-Things (IoT) devices in one or more groupings of IoT devices fail. Determining whether an IoT device fails can be performed by checking heartbeat or keepalive messages received from IoT devices in a grouping of IoT devices. In order to provide data and interact with the physical world, IoT devices can connect to a network through a gateway or another edge device. In some examples, IoT devices can communicate directory with a management service over a network connection. IoT devices managed by a management service can be grouped into logical groupings. For example, devices assigned to a particular building, portion of a building, a tenant, user, or other groupings can be utilized.

In prior art embodiments, to detect whether a particular IoT device is down, a table data structure for the IoT grouping is maintained. The IoT devices are instrumented to send operational status indications or heartbeat messages to a management service. The table data structure can be updated with a device identifier for a particular IoT device and a timestamp corresponding to when the message was received. The management service can check the operational status of the IoT devices in the grouping periodically according to a check interval. An IoT device can be considered offline or down if it has not sent a heartbeat message within a certain amount of time, which can be referred to as an offline check period. When a table data structure is utilized, the management service can be required to traverse the entire table and check the timestamp of each entry in the table to identify the IoT devices that are offline.

Such a framework presents scalability challenges. The computational load of an offline detection system using this framework is proportional to the number of IoT devices in a grouping and inversely proportional to the length of the check interval. Additionally, when all or most devices are online and reporting their respective health statuses periodically, this presents efficiency problems because the management service is generally required to receive and store heartbeat messages from the various IoT devices that are being received. Mere receipt and storage of these messages causes computational load because an entry corresponding to an IoT device must be located and updated in the table data structure, which can be an inefficient operation. This problem is only exacerbated as the number of IoT devices in a grouping increases.

Examples of this disclosure present a more efficient framework for the offline detection of IoT devices in a grouping of IoT devices. The computational cost of offline detection according to examples of the disclosure is proportional to the number of groupings of IoT devices rather than the number of IoT devices in the groupings. Rather than using a table data structure to maintain a record of the last check-in or heartbeat message of each IoT device in a grouping, a linked hash map can be utilized. The linked hash map provides for fast removal and insertion while also maintaining an order in which items are inserted. The linked hash map provides O(1) time complexity for insertion/deletion/lookup while preserving the insertion-order. In other words, the time complexity for insertion/deletion/lookup does not increase as the number of items in the linked hash map increases. The head, or the earliest, node of the linked hash map is maintained. If the head of the data structure corresponds to an IoT device that is not older than an offline check period, all of the IoT devices in the grouping can be considered online. Accordingly, the computational cost of performing offline detection is significantly reduced.

With reference to FIG. 1, shown is an example of a networked environment 100. The networked environment 100 can include a management system 103, Internet-of- Things (IoT) devices 113 that are logically organized into device groupings 115, and other components in communication with one another over a network 112. In some cases, IoT devices 113 and other devices can connect to the network 112 through a gateway. In other cases, the IoT devices 113 may have the capability to connect to the network 112 directly. The components of the networked environment 100 can be utilized to onboard IoT devices 113 with the management service 120, manage the IoT devices 113, and perform various operations associated with one or more device groupings 115 of IoT devices 113. The management system 103 can perform various operations associated with deployment and management IoT devices 113, including detecting uptime or downtime of one or more IoT devices 113 in a device grouping 115.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some embodiments, the management system can be part of a local network and can be local to at least one of the other components of the networked environment, for example, as shown in FIG. 1. In other embodiments, the management system 103 can be remote from the other components, or the computing devices of the management system 103 can be in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120 as well as other applications, services, processes, systems, engines, or functionality not discussed in detail herein. The management service 120 can be stored in the data store 123 of the management system 103. While referred to generally as the management service 120 herein, the various functionalities and operations discussed can be provided by the management service 120 or any of its components.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory. The data store 123 can include memory of the management system 103, mass storage resources of the management system 103, or any other storage resources on which data can be stored by the management system 103. The data stored in the data store 123 can include, for example, management data including an IoT device registry 127, device grouping data 130, and potentially other data.

The IoT device registry 127 can include information about IoT devices that are managed by the management service 120. Among other data, the IoT device registry 127 can include a device identifier 128 and a grouping assignment 129. The device identifier 128 can include a unique device identifier, a media access control address, or another identifier that uniquely identifies a device with respect to other devices. A grouping assignment 129 can specify a device grouping 115 to which a particular IoT device is assigned. A device grouping 115 can represent a logical grouping of IoT devices 113 that are managed by the management service 120. The grouping can represent a physical area, a user, an organization, or any other category by which IoT devices 113 might be desired to be grouped. A device grouping 115 can also represent a subgroup of a category by which IoT devices 113 are grouped.

An IoT device 113 can be enrolled or managed by the management service 120. The management service 120 can manage the IoT device 113 through a gateway or edge device. Additionally, the management service 120 can obtain data generated by IoT devices 113, which can trigger one or more actions. For example, a temperature sensor can report periodic temperature data. If the temperature exceeds or drops below a threshold, the management service 120 can generate alerts or take an action in a service endpoint or third party service based upon the temperature data.

Device grouping data 130 can store information about device groupings 115. The device grouping data 130 can include identifying information about a device grouping 115, such as a category or other metadata. Additionally, the device grouping data 130 can include a grouping data structure 131 corresponding to the device groupings 115 that are managed by the management service 120. A grouping data structure 131 can be created to store heartbeat messages from IoT devices 113 along with a timestamp that corresponds to when the heartbeat message was generated or received by the management service 120.

Each device grouping 115 can have its own grouping data structure 131 within the device grouping data 130. The IoT devices 113 in a device grouping 115 are associated with a common offline check period. In some implementations, a single grouping data structure 131 can be generated for the various device groupings 115 managed by the management system 120. A grouping data structure 131 can be a linked hash map. A linked hash map represents a data structure that is similar to a hash map but that also maintains an order in which elements are added to the data structure. The nodes of a linked hash map can include key-value pairs. Accordingly, a linked hash map can provide the benefit of speedy insertion, removal, and search, while also providing the benefit of a linked list in that order is maintained.

Therefore, each node in a grouping data structure 131 can be represent a heartbeat message received by the management service 120 for a particular IoT device 113 in a device grouping 115. A node can be keyed by a device identifier of an IoT device 113, and the value can be a timestamp of when the heartbeat message was received. The head of the grouping data structure 131 can represent the heartbeat message with the earliest timestamp. As new heartbeat messages are received, the node corresponding to the IoT device 113 to which the heart message corresponds is removed from the grouping data structure 131. A new node corresponding to the IoT device 113 is inserted at the tail of the grouping data structure 131. The new node has a timestamp corresponding to when the heartbeat message was received.

The management service 120 can oversee the management of devices such as IoT devices 113. The management service 120 can also oversee the management of other types of devices, such as personal computers, mobile devices, edge devices, or other devices that can be enrolled as managed devices with the management service 120. The management service 120 can oversee the operation of the devices enrolled with the management service 120 as well as enrollment and un-enrollment operations for the devices, for example, using the management service 120. The management service 120 can provide functionality using application program interfaces (APIs). To this end, an API of the management service 120 can provide enrollment information regarding a device, such as whether the device is enrolled with the management service 120. APIs or API calls can be provided for other functionalities of the management service 120 as discussed herein.

Once enrolled as managed devices with the management service 120, IoT devices 113 and other devices that are managed by the management service 120 can periodically send heartbeat messages 190, which are also referred to as operational status indications, check-in messages, or keepalive messages. The IoT devices 113 can be instrumented or commanded to send in heartbeat messages 190 at varying intervals. The intervals can be selected based upon the category of IoT device 113, the device grouping 115 to which the IoT device 113 is assigned, or based upon a user-selected offline check period. If a heartbeat message 190 for a particular IoT device 113 is not received within an offline check period, the IoT device 113 can be considered to be offline. Heartbeat messages 190 can be sent through the network 112 by the IoT device 113 or through a gateway device that is coupled to the network 112 and in communication with the management service 120.

The management service 120 can be instrumented to check for the offline status of one or more IoT devices 113 after a particular check interval. In other words, after the passage of a check interval, the management service 120 can determine whether any of the IoT devices 113 in a device grouping 115 are offline. The check interval can be user selected and vary by device grouping 115.

The check interval and offline check period can be different from one another. For example, the check interval for a device grouping 115 can be one minute, which means that the management service 120 checks for an offline IoT device 113 in a device grouping 115 every minute. The offline check period in this example can be five minutes, which means that an IoT device 113 is deemed to be offline unless a heartbeat message 190 for the IoT device 113 has been generated or received by the management system 120 within the past five minutes. In other words, the IoT device 113 is deemed to be offline unless a timestamp associated with a heartbeat message 190 for the IoT device 113 is within the past minute.

If an IoT device 113 is deemed to be offline, the management service 120 trigger various actions. The management service 120 can trigger an alert that notifies an administrator or other user about an offline status of an IoT device 113. The notification can be sent via email, push notification, messaging, or placed in a dashboard user interface. In some examples, detection of an offline status of an IoT device 113 can cause the management service 120 to attempt remedial action to bring the IoT device 113. A remedial action can include a reset command or another type of command sent to the IoT device 113 over the network 112.

Commands can be sent to IoT devices 113 by the management service 120 in various ways. The IoT device 113 can be instrumented to check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the IoT device 113 or a gateway through which the IoT device 113 is connected to the network 112 check-in with the management service 120. The notification service can push or otherwise route a notification to the IoT device 113 or gateway. The notification can include a command from the management service 120 for the IoT device 113.

The IoT devices 113 can be appliances, vehicles, sensors, controllers, actuators, and other physical devices including at least: a processor, network communication hardware, and a memory including executable instructions for communicating with a gateway or with the management service 120 over the network. The IoT device 113 can be representative of one or more IoT devices 113. The IoT device 113 can include appliances, vehicles, sensors, controllers, actuators, monitors, phones, tablets, thermostats, speakers, screen boards, kiosks, and other devices and can incorporate processor-based systems, such as a computer system or any other device with like capability. The IoT device 113 can, in some examples, include a headless device without a graphical user interface. Such a headless device can have inputs and outputs through other interfaces like network or serial ports. An IoT device 113 can include an ad board, information board, or other screen board that provides a graphical display but generally does not provide for user interaction with the graphical display and rejects access to system functions. In further cases, an IoT device 113 can include a kiosk or interactive graphical user interface that is locked into a defined functionality and rejects access to system functions. The IoT device 113 can have an operating system or other software that can perform functionalities and execute applications. The IoT device 113 can execute an IoT management process or application to perform or access the functionality described for the management service 120.

The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

Figure 2:
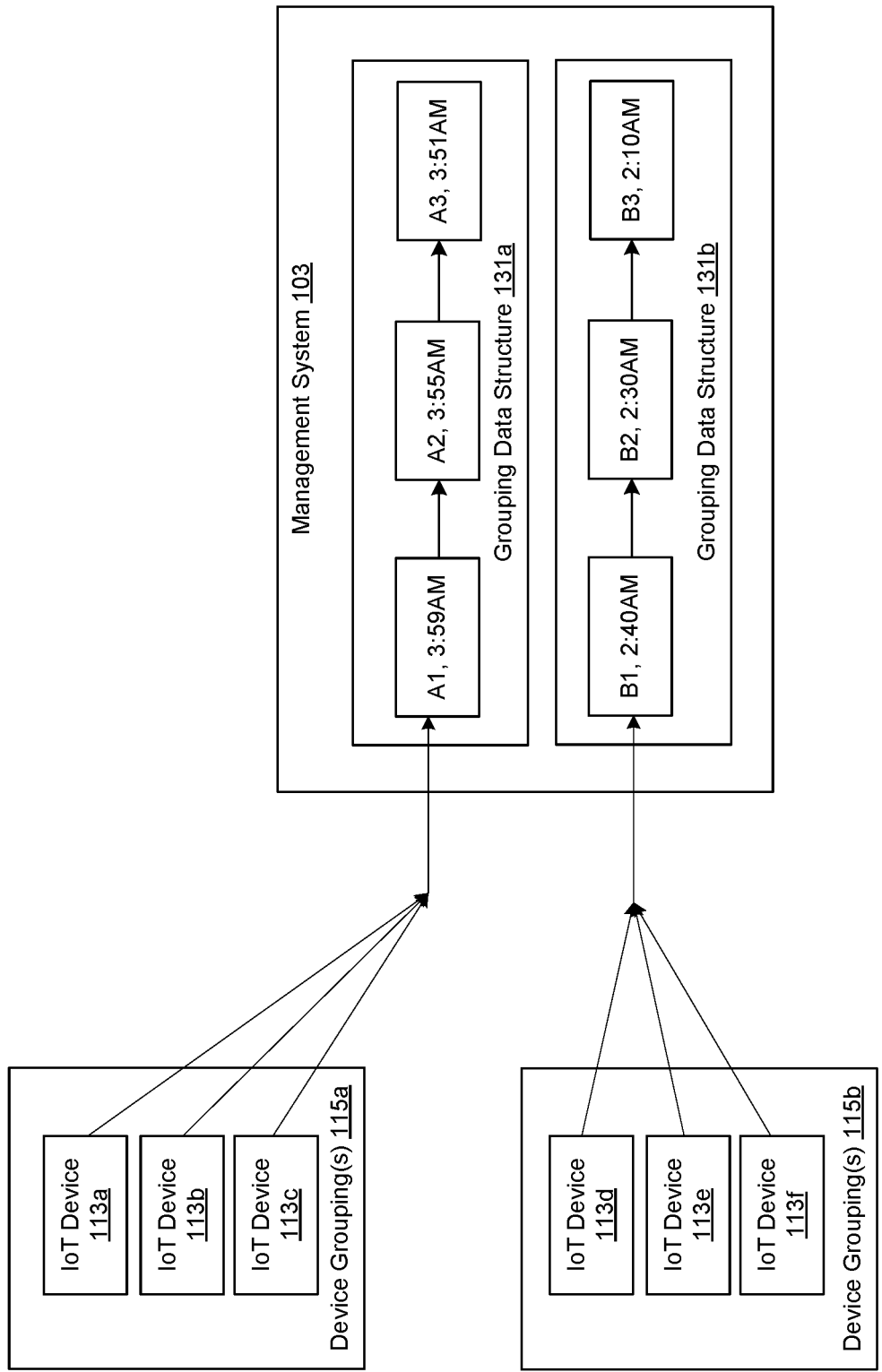
FIG. 2 is drawing illustrating functionality of device grouping data structures according to examples of the disclosure.

As noted above, the IoT device 113 can be instrumented to send a heartbeat message 190 periodically to the management service 120. The heartbeat message 190 can include a device identifier and/or a timestamp. The heartbeat message 190 can cause a node in the FIG. 2 illustrates how the management service 120 can utilize grouping data structures 131a, 131b to detect whether one or more IoT devices 113 are down according to examples of the disclosure. FIG. 2 depicts two device groupings 115a, 115b that respectively include IoT devices 113a-113f. Although only two device groupings 115a, 115b are depicted, it should be noted that the management service 120 can manage more than two device groupings 115 and that device groupings 115 can have more than three IoT devices 113. The example shown in FIG. 2 is merely illustrative to describe how the management service 120 can perform detection of downed IoT devices 113. The IoT devices 113 in the respective device groupings 115 are instrumented to report heartbeat messages or operational status indications to the management service 120 periodically. The device groupings 115a, 115b, can be configured to report operational status indications at different intervals. Additionally, the management service 120 can perform offline detection at different check intervals for each of the device groupings 115a, 115b. The management service 120 can detect whether one or more of the IoT devices 113 in a device grouping 115 is offline at a respective check interval. The check interval can vary by device grouping 115.

In the example of FIG. 2, the device grouping 115a can correspond to grouping data structure 131a and the device grouping 115b can correspond to grouping data structure 131b. Device grouping 115a can also have a different offline check period than device grouping 115b. In other words, an IoT device 113 in device grouping 115a can be considered offline after a different period of time than an IoT device 113 in device grouping 115b.

As depicted in the example of FIG. 2, the management service 120 can maintain grouping data structures 131a, 131b that correspond to the device groupings 115a, 115b. The grouping data structures 131a, 131b are implemented by the management service 120 as linked hash maps. A heartbeat message 190 can be provided to the management service 120 with a device identifier and a timestamp. In some implementations, the management service 120 can generate a timestamp upon receipt of a heartbeat message 190 from an IoT device 113.

When a heartbeat message is received from an IoT device 113, the management service 120 can locate a node in the grouping data structure 131 corresponding to the IoT device 113. The management service 120 can remove the existing node in the grouping data structure 131 for the IoT device 113 and insert a new node at the tail of the linked hash map for the IoT device 113. The existing node can be located by searching the linked hash map for a node with the device identifier of the IoT device 113. The new node inserted at the tail of the linked hash map can be inserted with the device identifier as the key and the timestamp as the value. In the example of FIG. 2, a node corresponding to device identifier A1 is inserted at the tail of the grouping data structure 131a. The node is keyed by device identifier A1 and a value is the timestamp corresponding to the heartbeat message, or 3:59 AM. Because newly received heartbeat messages 190 correspond to nodes added to the tail of the linked hash map, the earliest received heartbeat message 190 corresponds to a node in the grouping data structure 131 at the head of the linked hash map.

To determine whether one or more IoT devices 113 in a device grouping 115 are considered offline, the management service 120 can check the head of a grouping data structure 131 and determine whether the timestamp of the head node reflects that the corresponding IoT device 113 is offline. If the timestamp of the head node reflects that it is not offline, the management service 120 need not check any other nodes in the grouping data structure 131 because a respective timestamp of all of the other nodes until the tail node are necessarily newer than the head. The reason all of the other nodes are newer than the head and need not be checked in this scenario is that new nodes are always added at the tail of the linked hash map.

If the timestamp of the head node reflects that the corresponding IoT device 113 is offline, the management service 120 can designate the IoT device 113 as offline and then check the next oldest node in the grouping data structure 131. The next oldest node is the node connected to the head node. If the next oldest node reflects that its corresponding IoT device 113 is online, the management service 120 can cease checking nodes because the next oldest node and any node after that in the linked hash map have timestamps newer than the next oldest node. If the next oldest node reflects that its corresponding IoT device 113 is offline, the management service 120 can designate the IoT device 113 as offline and then keep traversing the linked hash map until it arrives at a node that is not offline.

The above methodology can save significant computational cost because the management service 120 need only check nodes in the grouping data structure 131 that are offline and a single node that is online in order to determine the offline status of all IoT devices 113 in a respective device grouping 115. In other words, offline detection can be performed without individually checking the operational status of a remainder of IoT devices 113 in a device grouping 115 once the first online IoT device 113 is identified. In contrast, a methodology employing a table structure requires a check of all IoT devices 113 in the table each time an offline check is performed by the management service 120.

Figure 3:
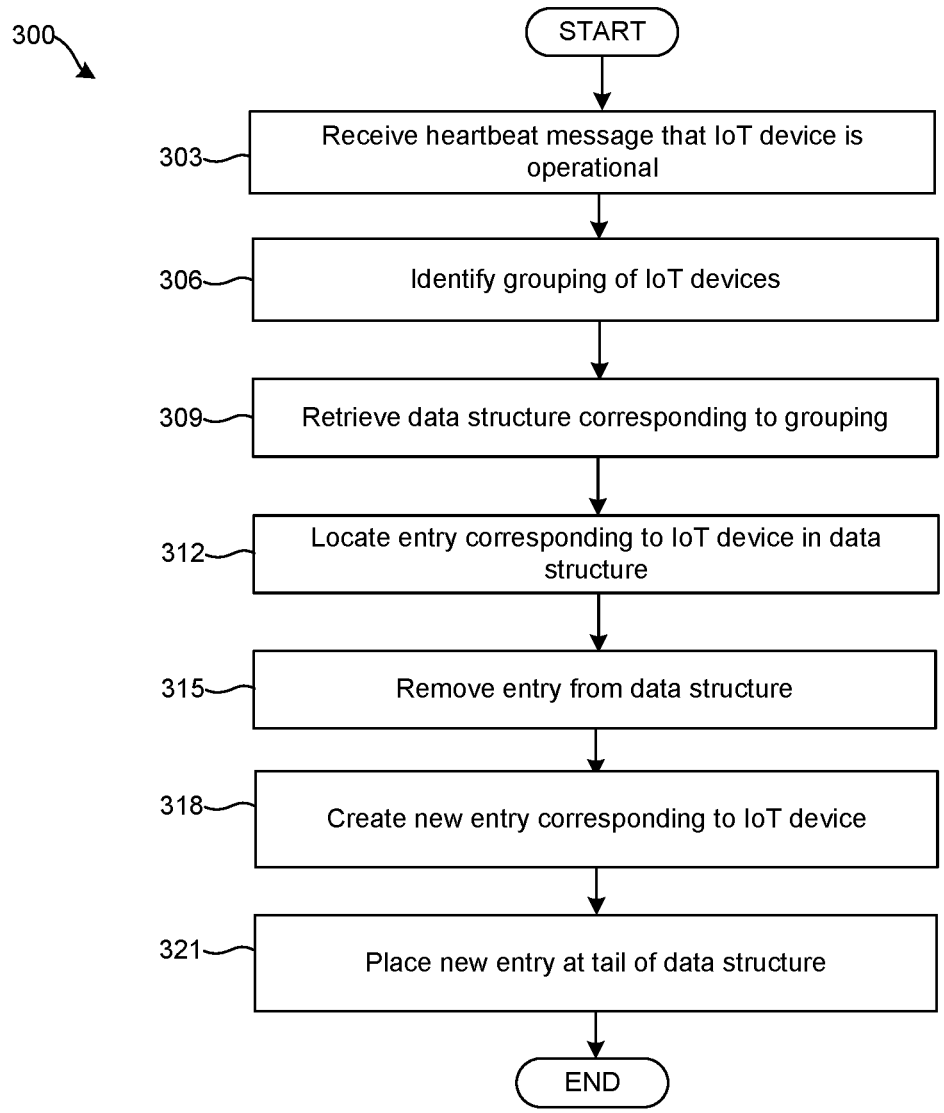
FIG. 3 is a flowchart illustrating functionality implemented by components of the networked environment.

FIG. 3 shows a flowchart 300 that illustrates an example of the operation of the management service 120. Flowchart 300 illustrates an example of how the management service 120 can process a heartbeat message 190 or an operational status indication from an IoT device 113 to populate a respective grouping data structure 131 with information about the status of the IoT devices 113 in a device grouping 115.

In step 303, management service 120 can receive a heartbeat message 190 from an IoT device 113 indicating that the IoT device 113 is operational. The heartbeat message 190 can include a device identifier and a timestamp. In some implementations, the heartbeat message 190 can include a device identifier, and the management service 120 can generate a timestamp corresponding to when the heartbeat message 190 was received.

At step 306, the management service 120 can identify a device grouping 115 to which the IoT device 113 belongs. The device grouping 115 can be associated with a particular grouping data structure 131 that can be implemented as a linked hash map. At step 309, the management service 120 can retrieve or access the appropriate grouping data structure 131 corresponding to the identified device grouping 115. Again, the grouping data structure 131 can be implemented as a linked hash map, which can offer fast insertion and removal of nodes from the data structure while also maintaining insertion order. Accordingly, a node that is neither the head or tail of the linked hash map can be efficiently removed and a new node inserted at the tail of the data structure.

At step 312, the management service 120 can locate an entry or node in the grouping data structure 131 that corresponds to the received heartbeat message 190. The management service 120 can locate the entry by searching or traversing the linked hash map of the grouping data structure 131 for the device identifier of the received heartbeat message 190.

At step 315, once the node corresponding to the received heartbeat message 190 is located the node or entry can be removed from the grouping data structure 131. In the event that no node corresponding to the device identifier exists, the step of removal can be omitted. No node may exist for the device identifier if the IoT device 113 has not yet provided a first heartbeat message 190 to the management service 120.

At step 318, a new node or entry corresponding to the device identifier can be created. The new entry can also include a timestamp corresponding to receipt of the heartbeat message 190. The new entry can be keyed by the device identifier of the IoT device 113 and have a value that corresponds to the timestamp. At step 321, the new node can be placed at the tail of the grouping data structure 131. It should be appreciated that in some alternative implementations, the head of the grouping data structure 131 can be where new or the most recent nodes are placed, and the tail of the grouping data structure 131 can be where the oldest nodes are kept. Thereafter, the process proceeds to completion.

Figure 4:
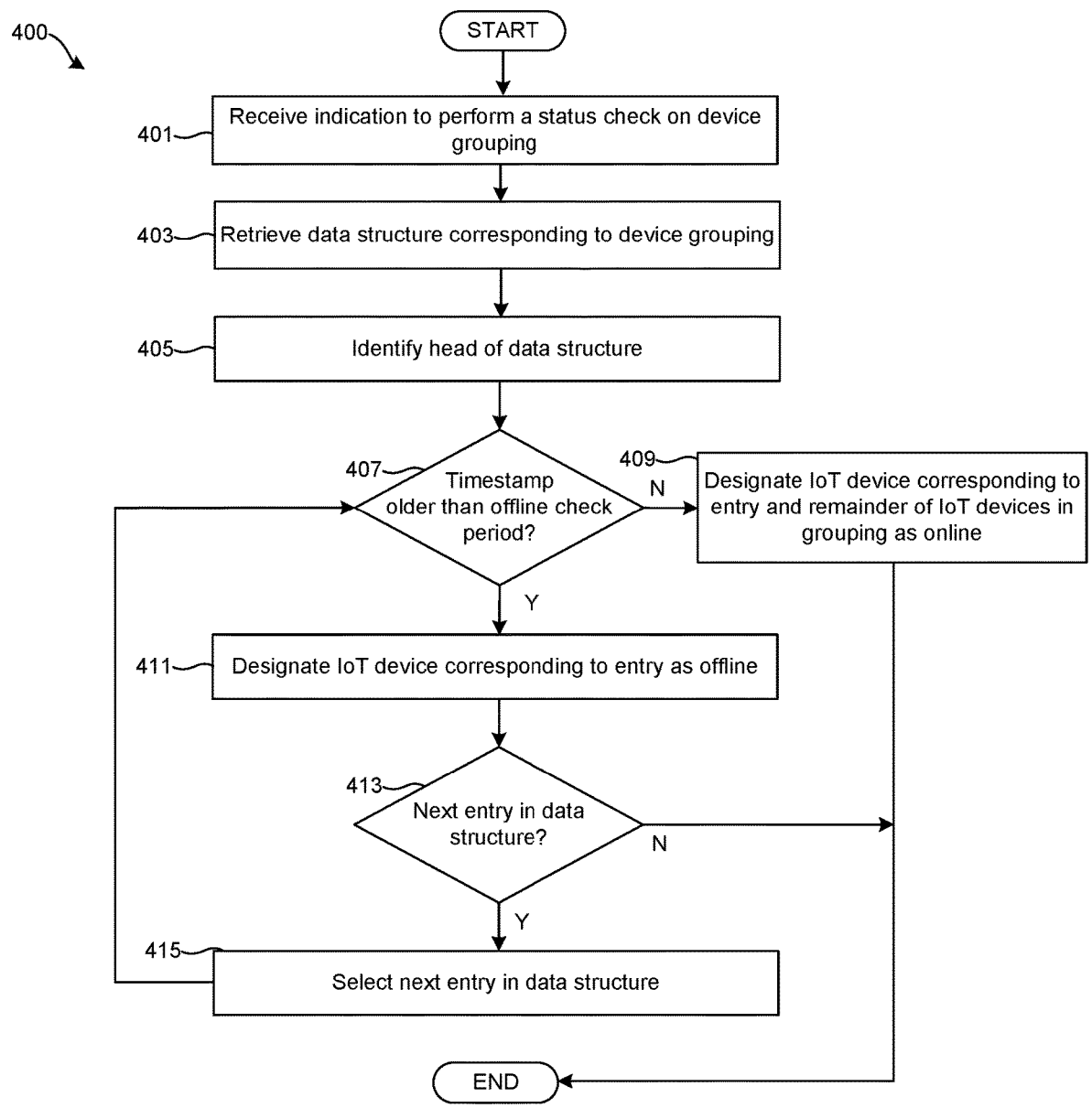
FIG. 4 is a flowchart illustrating functionality implemented by components of the networked environment.

FIG. 4 shows a flowchart 400 that illustrates an example of the operation of the management service 120. Flowchart 400 illustrates an example of how the management service 120 can perform offline detection of IoT devices 113 within a device groping 115 of IoT devices 113. First, at step 401, the management service 120 can receive an indication to perform a status check of the IoT devices 113 within a device grouping 115. In other words, the management service 120 can determine to check whether any IoT devices 113 within a device grouping 115 are offline. The status check can be performed periodically, such as after passage of a check interval period of time. For example, a particular device grouping 115 can be configured such that a status check is performed every five minutes or according to some other check interval.

At step 403, the management service 120 can access or retrieve the grouping data structure 131 corresponding to the device grouping 115. The grouping data structure 131 can be a linked hash map maintained by the management service 120 for storing nodes that correspond to received heartbeat messages 190 from IoT devices 113 in the device grouping 115.

At step 405, the management service 120 can locate the head of the linked hash map of the grouping data structure 131. To determine whether one or more IoT devices 113 in a device grouping 115 are considered offline, the management service 120 can first check the head of a grouping data structure 131 and determine whether the timestamp of the head node reflects that the corresponding IoT device 113 is offline.

At step 407, the management service 120 can first check the head of a grouping data structure 131 and determine whether the timestamp of the head node reflects that the corresponding IoT device 113 is offline. The management service 120 can make this determination by determining whether the timestamp of the head node reflects that the last received heartbeat message 190 from the IoT device 113 corresponding to the node is older than an acceptable offline check period. In other words, the offline check period can allow for an IoT device's last received heartbeat message that is younger than a particular age be considered online. If the last received heartbeat message is older than a particular age, specified by the offline check period, than the IoT device 113 is considered to be offline.

If the timestamp of the head node reflects that it is not offline, the management service 120 can proceed to step 409. In this scenario, the management service 120 need not check any other nodes in the grouping data structure 131 because a respective timestamp of all of the other nodes until the tail node are necessarily newer than the head. The reason all of the other nodes are newer than the head and need not be checked in this scenario is that new nodes are always added at the tail of the linked hash map. At step 409, the management service 120 can designate all of the IoT devices 113 in the device grouping 115 to be online. Thereafter, the process can proceed to completion.

If the timestamp of the head node reflects that the IoT device 113 corresponding to the head node is offline, the management service 120 can proceed from step 407 to step 411. At step 411, the management service 120 can designate the IoT device 113 corresponding to the head node as offline. In some implementations, the management service 120 can trigger one or more actions in response to designating an IoT device 113 offline, such as notifications to an administrator, issuing of additional commands to the IoT device 113, or issuing of commands to other devices.

From step 411, the process can proceed to step 413, where the management service 120 can determine whether there are additional nodes in the grouping data structure 131. In other words, the management service 120 can determine whether there is a next oldest node in the data structure for which offline detection should be performed. If there is not a next oldest node in the data structure, the process can proceed to completion. If there is a next oldest node, the process can proceed to step 415.

At step 415, the management service 120 can select the next oldest node in the grouping data structure 131. The management service 120 can check the next oldest node in the grouping data structure 131 to determine whether it is offline. The next oldest node is the node connected to the head node or the node connected to the previously identified node that corresponded to an offline IoT device 113. The process can return to step 407 from step 415.

At step 407, if the next oldest node reflects that its corresponding IoT device 113 is online, the process can proceed from step 407 to step 409, where the management service 120 can cease checking nodes because the next oldest node and any node after the next oldest node in the linked hash map have timestamps newer than the next oldest node. If the next oldest node reflects that its corresponding IoT device 113 is offline, the management service 120 can designate the IoT device 133 as offline and then keep traversing the linked hash map until it arrives at a node that is not offline. Thereafter, the process can proceed to completion.

If the next oldest node reflects that its corresponding IoT device 113 is offline, the process can proceed to step 411 again, where the management service 120 designates the IoT device 113 corresponding to the next oldest node as offline. Again, one or more actions can be triggered by designating the IoT device 113 as offline. In some implementations, the IoT device 113 can designate one or more IoT devices 113 as offline before performing a remedial action in response to an offline designation. Additionally, the offline designation of the one or more IoT devices 113 can result in an action being taken that varies from IoT device 113 to IoT device 113. From step 411, the process can proceed to step 413 again, where the management service 120 can again determine whether there is a next oldest node in the grouping data structure 131. Accordingly, the management service 120 can iteratively traverse the grouping data structure 131 until all offline nodes or offline IoT devices 113 are identified until the first online node or online IoT device 113 is identified. Once the first online IoT device 113 is identified, the process can proceed to completion from step 409.

The above methodology can save significant computational cost because the management service 120 need only check nodes in the grouping data structure 131 that are offline and a single node that is not offline in order to determine the offline status of all IoT devices 113 in a respective device grouping 115. In contrast, a methodology employing a table structure requires a check of all IoT devices 113 in the table each time an offline check is performed by the management service 120.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113 and devices including the management system 103 can include a display upon which user interfaces can be rendered. The IoT devices 113 and devices including the management system 103 can also include one or more input/output devices that can include, for example, a capacitive touchscreen or other type of touch input device, fingerprint reader, or keyboard.

Although the management service 120 and other various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   a computing device comprising at least one processor; and
   a memory comprising executable instructions, wherein the instructions, when executed by the at least one processor, cause the computing device to at least:
   identify a grouping of items represented in a data structure, wherein individual entries within the data structure comprise an identifier and a timestamp;
   receive, from one of the items in the grouping, an indication that the one of the items is operational;

replace a first entry in the data structure corresponding to the one of the items with a new entry comprising a respective identifier and a respective timestamp corresponding to when the indication was received; and periodically traverse the data structure to determine whether any of the items the grouping have failed to send a respective operational indication within an offline check period, wherein the data structure is ordered according to the timestamp of a respective entry in the data structure.

2. The system of claim 1, wherein the data structure comprises a linked hash map that preserves ordering according to timestamp, and wherein a respective key for entries in the data structure is the identifier.

3. The system of claim 2, wherein the instructions periodically traverse the data structure by:

identifying a head of the linked hash map, wherein the head of the linked hash map comprises an oldest entry in the data structure according to the timestamp;

in response to determining that the head of the linked hash map has a first timestamp that indicates that an item corresponding to the head of the linked hash map is offline based on the offline check period, identifying a next oldest member of the linked hash map; and iterating through the linked hash map to identify members of the linked hash map with a respective timestamp and indicates that a respective item is offline.

4. The system of claim 3, wherein the instructions periodically traverse according to a check interval, wherein the offline check period is different from the check interval.

5. The system of claim 1, wherein the instructions, when executed, further cause the at least one computing device to at least:

identify a second grouping of items represented in a second data structure;

receive, from one of the items in the second grouping, an indication that the one of the items in second grouping is operational;

replace a second entry in the second data structure corresponding to the one of the items in the second grouping with a new entry comprising a respective identifier and a respective timestamp corresponding to when the indication was received; and periodically traverse the second data structure to determine whether any of the second grouping of items have failed to send a respective operational indication within a second check interval, wherein the second data structure is ordered according to the timestamp of a respective entry in the second data structure.

6. The system of claim 4, wherein the instructions periodically traverse the data structure by:

identifying a head of the linked hash map, wherein the head of the linked hash map comprises an oldest entry in the data structure according to the timestamp; and in response to determining that the head of the linked hash map has a first timestamp that indicates that an item corresponding to the head of the linked hash map is operational, generate a determination that all of the items in the grouping are operational.

7. The system of claim 6, wherein the determination that all of the items in the grouping are operational is made without individually checking an operational state of a remainder of the items in the grouping.

8. A non-transitory computer-readable medium embodying instructions that, when executed by at least one computing device, cause the at least one computing device to at least:

identify a grouping of items, the grouping of items represented in a data structure, wherein individual entries within the data structure comprise an identifier and a timestamp;

receive, from one of the items in the grouping, an indication that the one of the items is operational;

replace a first entry in the data structure corresponding to the one of the items with a new entry comprising a respective identifier and a respective timestamp corresponding to when the indication was received; and periodically traverse the data structure to determine whether any of the items in the grouping have failed to send a respective operational indication within an offline check period, wherein the data structure is ordered according to the timestamp of a respective entry in the data structure.

9. The non-transitory computer-readable medium of claim 8, wherein the data structure comprises a linked hash map that preserves ordering according to timestamp, and wherein a respective key for entries in the data structure is the identifier.

10. The non-transitory computer-readable medium of claim 9, wherein the instructions periodically traverse the data structure by:

identifying a head of the linked hash map, wherein the head of the linked hash map comprises an oldest entry in the data structure according to the timestamp;

in response to determining that the head of the linked hash map has a first timestamp that indicates that an item corresponding to the head of the linked hash map is offline based on the offline check period, identifying a next oldest member of the linked hash map; and iterating through the linked hash map to identify members of the linked hash map with a respective timestamp and indicates that a respective item is offline.

11. The non-transitory computer-readable medium of claim 10, wherein the instructions periodically traverse according to a check interval, wherein the offline check period is different from the check interval.

12. The non-transitory computer-readable medium of claim 8, wherein the instructions, when executed, further cause the at least one computing device to at least:

identify a second grouping of items represented in a second data structure;

receive, from one of the items in the second grouping, an indication that the one of the items in second grouping is operational;

replace a second entry in the second data structure corresponding to the one of the items in the second grouping with a new entry comprising a respective identifier and a respective timestamp corresponding to when the indication was received; and periodically traverse the second data structure to determine whether any of the second grouping of items have failed to send a respective operational indication within a second check interval, wherein the second data structure is ordered according to the timestamp of a respective entry in the second data structure.

13. The non-transitory computer-readable medium of claim 11, wherein the instructions periodically traverse the data structure by:

identifying a head of the linked hash map, wherein the head of the linked hash map comprises an oldest entry in the data structure according to the timestamp; and in response to determining that the head of the linked hash map has a first timestamp that indicates that an item corresponding to the head of the linked hash map is operational, generate a determination that all of the items in the grouping are operational.

14. The non-transitory computer-readable medium of claim 13, wherein the determination that all of the items in the grouping are operational is made without individually checking an operational state of a remainder of the items in the grouping.

15. A method, comprising:
identifying a grouping of items, the grouping of items represented in a data structure, wherein individual entries within the data structure comprise an identifier and a timestamp;
receiving, from one of the items in the grouping, an indication that the one of the items is operational;
replacing a first entry in the data structure corresponding to the one of the items with a new entry comprising a respective identifier and a respective timestamp corresponding to when the indication was received; and
periodically traversing the data structure to determine whether any of the items in the grouping have failed to send a respective operational indication within an offline check period, wherein the data structure is ordered according to the timestamp of a respective entry in the data structure.

16. The method of claim 14, wherein the data structure comprises a linked hash map that preserves ordering according to timestamp, and wherein a respective key for entries in the data structure is the identifier.

17. The method of claim 16, wherein periodically traversing the data structure further comprises:
identifying a head of the linked hash map, wherein the head of the linked hash map comprises an oldest entry in the data structure according to the timestamp;
in response to determining that the head of the linked hash map has a first timestamp that indicates that an item corresponding to the head of the linked hash map is offline based on the offline check period, identifying a next oldest member of the linked hash map; and
iterating through the linked hash map to identify members of the linked hash map with a respective timestamp and indicates that a respective item is offline.

18. The method of claim 17, wherein periodically traversing is performed according to a check interval, wherein the offline check period is different from the check interval.

19. The method of claim 18, wherein periodically traversing the data structure further comprises:
identifying a head of the linked hash map, wherein the head of the linked hash map comprises an oldest entry in the data structure according to the timestamp;
in response to determining that the head of the linked hash map has a first timestamp that indicates that an item corresponding to the head of the linked hash map is operational, generate a determination that all of the items in the grouping are operational.

20. The method of claim 19, wherein the determination that all of the items in the grouping are operational is made without individually checking an operational state of a remainder of the items in the grouping.

* * * * *